Dec. 13, 1955  W. RODDER  2,726,754
ROTARY KICKOFF FOR COOLING BED
Filed June 2, 1951  3 Sheets-Sheet 1
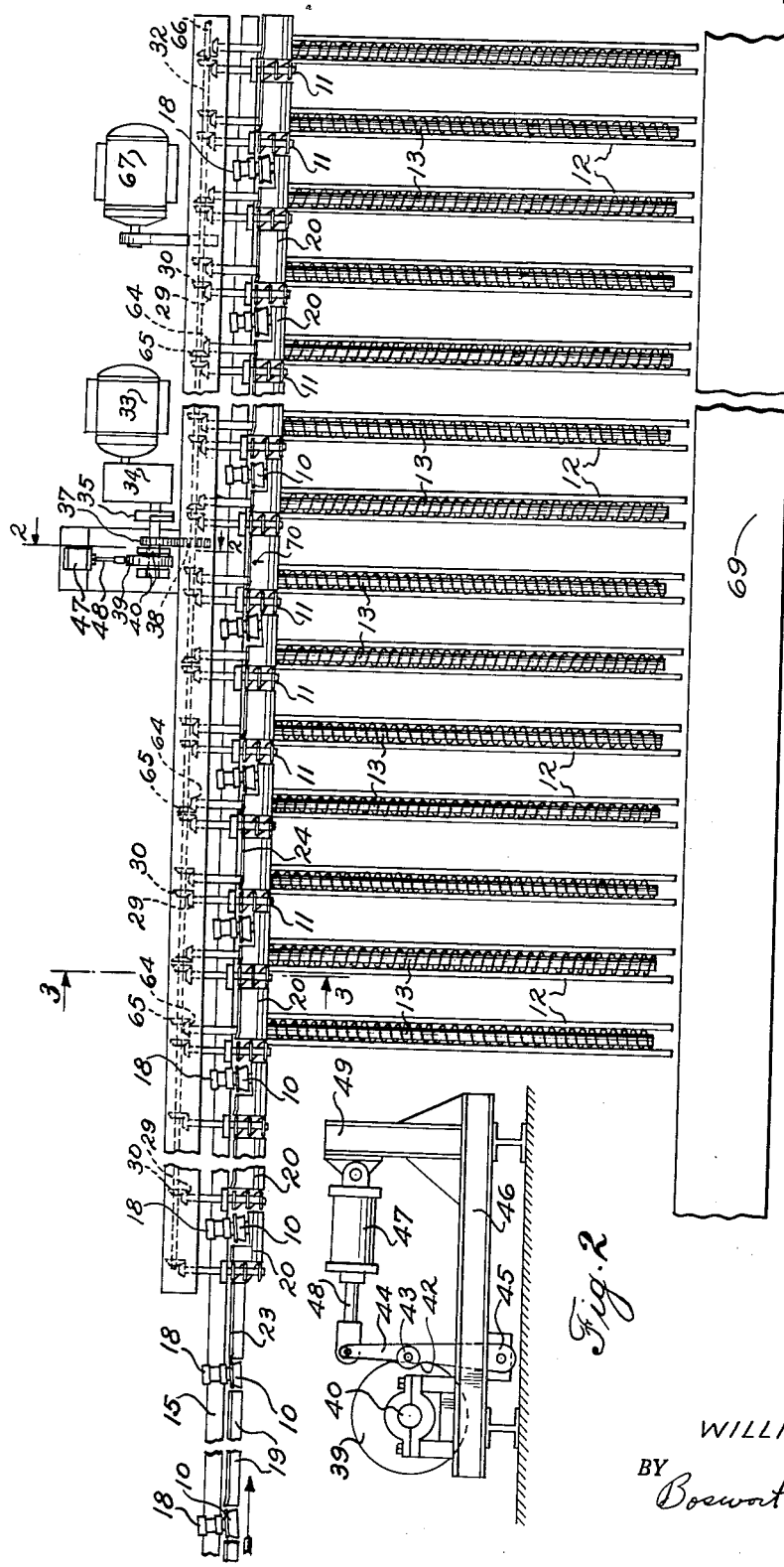
INVENTOR.
WILLIAM RODDER
BY Bosworth & Sessions
ATTORNEYS

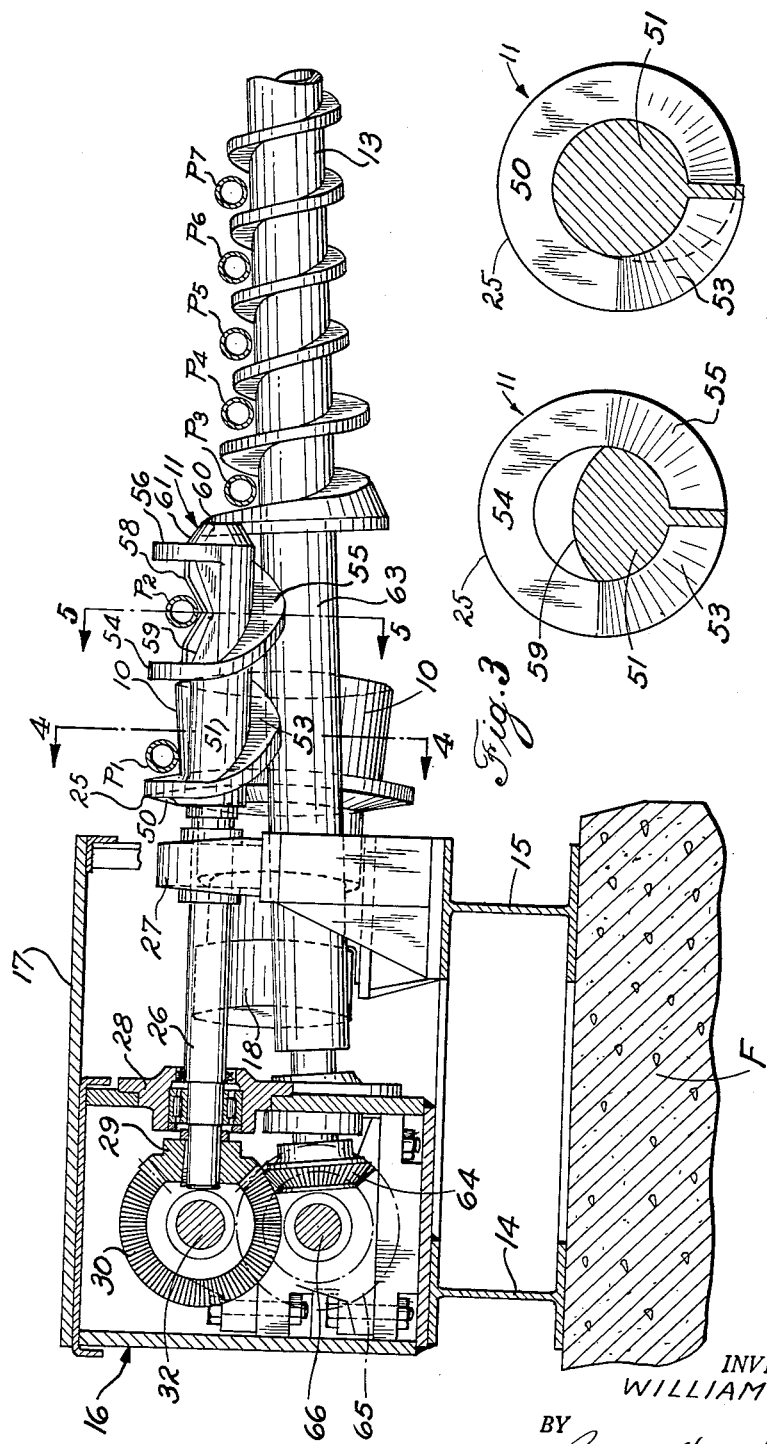

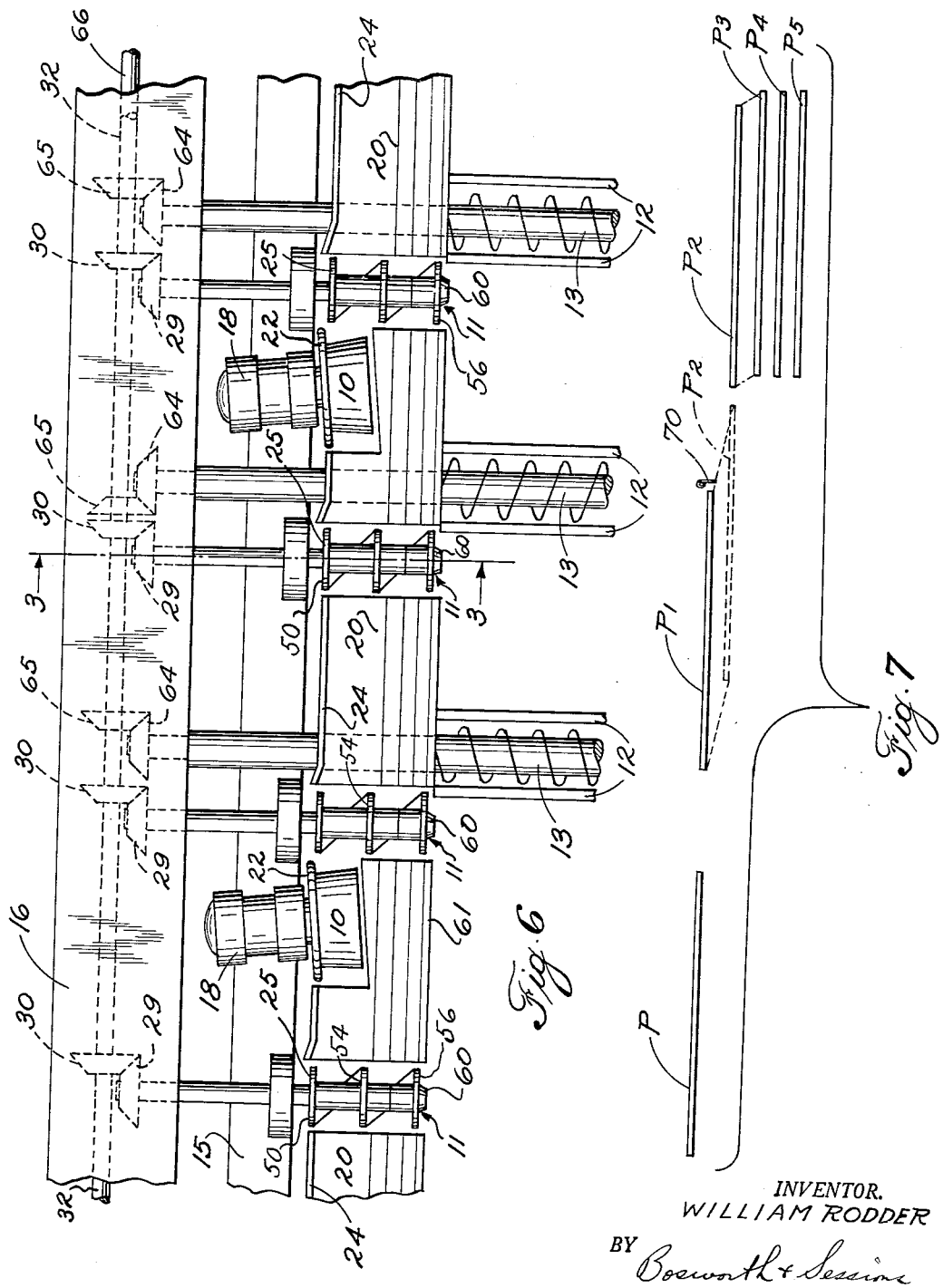

United States Patent Office 2,726,754
Patented Dec. 13, 1955

2,726,754
ROTARY KICKOFF FOR COOLING BED

William Rodder, Youngstown, Ohio, assignor to The Aetna-Standard Engineering Company, Youngstown, Ohio, a corporation of Ohio Application June 2, 1951, Serial No. 229,602

15 Claims. (Cl. 198—104)

This invention relates to conveyors for pipe, tube, rod and the like and more particularly to a kickoff apparatus adapted to transfer rapidly moving lengths of pipe, tube, rod or other elongated work pieces from a conveyor on which they are traveling in rapid succession in an axial path and deposit them on another conveyor, such as a cooling bed or the like on which they are carried in direction transverse to their axes and to their original direction of movement. The invention is described herein as applied to the production of butt welded pipe but it is to be understood that the invention may be adapted to other purposes and uses.

It is possible to produce butt welded pipe at very high rates of speed by a well known process in which skelp is heated nearly to welding temperature in a furnace and then passed through forming and welding rolls, the edges of the skelp being brought up to welding temperature and welded together at the welding rolls to form pipe. The operation is carried out continuously and welding mills can be operated at speeds of 1,000 or more feet per minute. The high rate of production makes the disposition of the pipe, which comes out of the welding mill at a high temperature, a major problem because it is obviously impractical to run the pipe out in the direction of its lengthwise travel for a distance great enough to permit it to cool.

Accordingly, in modern pipe mills it is the practice to saw or shear the pipe into commercial lengths of, for example, 20 to 40 feet as the pipe leaves the welding mill and without stopping the pipe; then, these rapidly moving lengths are moved successively onto a cooling bed or other conveyor; the longitudinal motion of the lengths is stopped; they are moved transversely of their axes on the bed and while so moving are permitted to cool.

In the past it has been the practice to deflect the lengths of pipe from their original path of travel along their own axes by a mechanism which after each kickoff operation had to reverse its movement and return to normal position before it was ready for the next kickoff operation. Another common practice has been simply to permit the leading ends of each length to engage a deflector which is slanted to deflect the pipe sideways onto the cooling bed. These methods are satisfactory where the speed of the pipe is not too great, but with higher pipe speeds—for example, speeds of the order of 1,000 feet per minute—serious difficulties are encountered. The difficulties result from the fact that the time interval between successive lengths of pipe is so short that the leading end of a following pipe may strike the kickoff mechanism as the mechanism is returning to get ready for the next cycle, or where the pipe is simply deflected sideways, the forward end of the following length of pipe may overtake and come into contact with the trailing end of a preceding length which is in the process of being deflected onto the cooling bed. Also, while the pipe is being moved sideways onto the cooling bed, it is still traveling longitudinally and gradually coming to rest so that its actual direction of movement is the resultant of its forward skidding speed and its lateral kickout speed. While the pipe is traveling in such a path it frequently happens that the leading end of the pipe strikes the conveying means of the cooling bed improperly. When this occurs, the rapidly moving lengths of hot pipe take erratic paths creating a serious hazard to the operators; also, a large number of lengths of pipe may become jammed in a very short time, making it necessary to stop the entire mill while the jam is being cleared, resulting in an expensive loss of production. Also, with this type of operation, the lengths of pipe frequently lie askew on the cooling bed and must be moved by hand to their proper places.

According to the present invention the disadvantages of prior types of apparatus are eliminated and extremely high speed operation is made possible by providing a kickoff mechanism in which a series of rotating cams or the like are provided to move each length of pipe bodily laterally when the length reaches a predetermined point on the apparatus. The trailing end of each length of the pipe is moved transversely out of the main line of longitudinal travel of the pipe simultaneously with the leading end of the length; thus the trailing end of each length of pipe is moved bodily out of the way of the leading end of the following length, thereby eliminating the danger of engagement between succeeding lengths of pipe and resulting cobbles. The longitudinal motion of the lengths is gradually stopped and the lengths are moved transversely step by step until they are deposited on the cooling bed conveyor in transversely spaced arrangement with their ends substantially in alignment, and without any substantial forward velocity.

A general object of the invention is the provision of an efficient and reliable kickoff apparatus adapted to move successive lengths of rapidly moving pipe, tube, rod or the like from a longitudinal conveyor transversely of their axes and deposit them successively on a cooling bed or other transverse conveyor. Further objects and advantages of the invention will become apparent from the following description of a preferred form thereof, reference being made to the accompanying drawings in which Figure 1 is a plan view of an apparatus embodying my invention. Figure 2 is a somewhat diagrammatic illustration of a portion of the drive mechanism of Figure 1, the view being taken as indicated by line 2—2 of Figure 1; Figure 3 is a cross-section taken as indicated by the line 3—3 of Figure 1; Figures 4 and 5 are cross-sectional details on an enlarged scale taken as indicated by lines 4—4 and 5—5 of Figure 3 and showing the cams utilized to move the work transversely; Figure 6 is a fragmentary plan view on an enlarged scale showing a portion of the apparatus illustrated in Figures 1 and 3; and Figure 7 is a diagram showing the manner in which the lengths of pipe travel through the apparatus.

As mentioned above, the apparatus of the present invention is particularly adapted for use in connection with high speed pipe mills in which pipe is produced in continuous lengths at speeds of, for example, 1,000 feet per minute, severed into commercial lengths of, for example, 20 to 40 feet long while it is very hot and then discharged laterally onto a cooling bed. Figure 1 of the drawings illustrates somewhat diagrammatically my apparatus as adapted for use in such an installation. In this figure the apparatus is shown as being adapted to receive lengths of pipe which are delivered from a butt weld pipe mill and a flying hot saw, neither of which are illustrated herein, to a longitudinal or axial conveyor made up of the conveyor rolls 10 which carry the successive lengths of pipe at high speed to the kickoff section in which they are moved transversely by the cams 11 and deposited upon a transverse conveyor such as the cooling bed indicated in general at 12 and comprising a series of conveyor screws 13, alternate screws being of opposite hand and rotating in opposite directions, as is conventional in cooling beds of this type.

The apparatus as a whole may be many feet long and comprises longitudinally extending frame members 14 and 15 supported on the foundation structure F (see Figure 3); frame member 14 in turn carries a hollow elongated housing 16 which extends for the length of the apparatus and contains within it the mechanism for driving the cams 11 and the cooling bed conveyor screws 13. A catwalk 17 may be supported on housing 16 as shown in Figure 3; this catwalk has been omitted from Figures 1 and 6 for convenience of illustration. The conveyor rolls 10, which are preferably driven by individual electric motors 18 are supported by frame member 15 as are the stationary guides 19 and 20. Frame member 15 continues on toward the welding mill and saw beyond the end of housing 16, a number of rolls 10 and guides 19 being required in the conveyor section of the apparatus to convey the lengths of pipe from the saw to the cams 11 in the kickoff section of the apparatus.

After the pipe has been severed into lengths by the hot saw, the individual lengths travel over rolls 10 and guides 19 and 20 until they are discharged laterally by the cams 11. In order to space the ends of successive lengths apart and thus to give the cams time to operate, the conveyor rolls 10 are driven at a speed somewhat higher than the speed of the pipe as it leaves the mill, for example, with the mill operating at 1,000 feet per minute, the conveyor rolls 10 may be driven by the motors 18 at a lineal speed of 1,200 feet per minute. It will be noted that the axes of the rolls 10 are slightly askew and that the pipe-bearing surfaces of the rolls are conical; both of these structural features tend to hold the lengths of pipe on the rolls in contact with or near the flanges 22 of the rolls and the vertical flanges 23 and 24 of the guides 19 and 20.

In order to move each length of pipe transversely of its own axis and thus bodily out of the path of the succeeding length, the cam members 11 are disposed in alignment with the path of the pipe as defined by rolls 10 and guides 19, alternating with the conveyor rolls 10 throughout the length of the kickoff section of the apparatus. Preferably these cam members are provided with threads 25 in the form of modified helixes as shown particularly in Figures 3, 4 and 5 as will be described in detail below. In any event, the cam members 11 are arranged so that in idle position and during part of their rotation they provide a clear path for longitudinal movement of the lengths of pipe, while upon rotation of all of them simultaneously through a predetermined amount, preferably a single revolution, the length of pipe adjacent to the cam members is moved bodily out of its line of travel transversely of its own axis a distance sufficient to permit the immediately following length of pipe to overtake it without interference. Preferably, the arrangement is such that the pipe is moved step by step, the first step being to a point where the pipe is still in an engagement with the cams but out of the line of travel of the succeeding length and then, upon the succeeding operation of the cams, the pipe is discharged onto the cooling bed. Preferably, the arrangement is such that after the length of pipe has been moved sideways by the cams out of line with the next following length, it will skid longitudinally to a complete rest before it is moved sideways again to roll into the cooling bed; the importance of this feature is that the lengths are not skidding while they are being deposited on the cooling bed, thus the lengths are positioned accurately on the bed and the likelihood of cobbles during this operation is substantially eliminated.

Each cam 11, as shown in Figures 3 and 6, is supported by a shaft 26 carried by suitable bearings 27 and 28 mounted on frame member 15 and in housing 16 respectively. The inner end of each shaft is provided with a bevel gear 29 which meshes with a bevel gear 30 keyed to line shaft 32. Line shaft 32 is, in turn, driven by motor 33 through reduction gearing 34, single-revolution clutch 35 and gears 37 and 38. (See Figure 1.) The clutch 35, which may be of conventional construction, is controlled by the pipe through means described below to engage the motor at the proper time so that the shaft 32 and, correspondingly, each shaft 26 and each cam 11 will be rotated one revolution only. Instead of employing a single revolution clutch, the single revolution of shaft 32 and cams 11 can also be obtained by stopping and starting the motor 33 for each cycle with suitable electric controls.

In order to locate the line shaft 32 accurately at the end of each rotation thereof, the mechanism shown in Figure 2 is preferably employed. This comprises an indexing disk 39 mounted upon countershaft 40 which rotates at the same speed as line shaft 32. Disk 40 has a peripheral notch 42 that is engaged by a roller 43 carried by a link 44 pivoted as at 45 to the supporting frame structure 46. Link 44 is urged toward the indexing disk 39 by pneumatic cylinder 47, connecting rod 48 being pivoted to the upper end of link 44; cylinder 47 is supported by the upright frame member 49. In operation, when the clutch 35 is engaged the disk 39 rotates, the roller 43, which rides on the periphery of the disk, is lifted out of the notch 42 against the force exerted by the cylinder 47. The clutch 35 is disengaged as the notch 42 approaches the roller 43 after the disk 39 has made a single revolution. The roller 43 then drops into the notch 42 and stops the rotation of the disk 39 and shaft 40, thus accurately locating the angular position of the shaft 40 and correspondingly, the angular position of line shaft 32 and the several cams 11.

The configuration of the cams 11 will be evident from Figures 3, 4, 5 and 6. As there shown, each cam has on it what may be considered as a thread 25, but the threads are not true helixes, being modified to provide paths for the unimpeded longitudinal travel of the pipe across the cams with the cams in idle position and to provide for rapid transverse movement of the pipe as the cams are rotated. Thus, each thread has an inner flange portion 50 which extends throughout substantially 360° of the cam and is disposed in a plane perpendicular of the axis of the cam. The flanges 50 are on the ends of the cams adjacent to housing 16 and, with the cams in idle position, the flanges 50 are in substantial alignment with the flanges 23 and 24 on the guides 19 and 20.

Integrally joined to the inner flanges 50 of the cams are work-engaging portions or ramps 53. These are helical in shape and occupy substantially 180° of the cams, extending beneath the hub portions of the cams when the cams are in the idle position. The longitudinal extent of the ramps 53 may be considered as being equal to the pitch of the thread-like cam surfaces. Each ramp 53 joins with an intermediate flange 54 which, like flange 50, lies in a plane perpendicular to the axis of the cam, and extends throughout approximately 180°. Portion 54 is spaced from portion 50 by a distance equal to the pitch of the cam and substantially equal to the length of the roll 10. Thus, with the cams in idle position, flanges 50 and 54 define a trough or passageway in alignment with the guides 19 and the path provided by the rolls 10; the cams do not engage the lengths of pipe carried by rolls 10 except incidentally as guides, the central or hub portions 51 of the cams being disposed beneath the level of the upper surfaces of the rolls 10 as shown particularly in Figure 3.

In order to move the lengths of pipe transversely an additional step beyond the movement provided by the ramps 53, each cam has a second helical ramp 55, similar in all material respects to ramp 53, which extends from one end of the intermediate flange 54 through about 180° of the cam. At its end, ramp 55 is joined to an outer flange 56 which, with flange 54, defines a second passageway or trough for the pipe sections. It is to be noted, however, that the arrangement is preferably such that the lengths of pipe normally do not contact the cams as they pass through the passage defined by flanges 54 and 56. To this end, the outer portions of guides 20 are longitudinally grooved, as at 58, to center the lengths between flanges 54 and 56, and the hubs of the cams are cut away as indicated at 59 in Figures 3 and 5 so that with the cams in idle position the surfaces of the hubs are disposed beneath the level of the guides 20.

It will be evident that, with the cams in the idle position shown in the drawings, lengths of pipe can be carried longitudinally through the passageway defined by the flanges 50 and 54 of the cams and, likewise, can slide longitudinally through the passageway defined by flanges 54 and 56. However, upon rotation of the cams through 360° a length of pipe, or other elongated work piece, which is being progressed through the apparatus on the rolls 10 as indicated at $P_1$ will be engaged by the ramps 53 of the series of cams and moved to the position $P_2$ between the flanges 54 and 56. Simultaneously, the length in position $P_2$ will be lifted partially out of the grooves 58 by the hubs 51 and engaged by the ramps 55 of the several cams and moved bodily beyond the flange 56, whereupon it will roll off the sloping ends 60 of the cams and the sloping flanges 61 of the guides 20 and be received in the first thread space of the conveyor screws 13 as indicated at $P_3$, the screws being disposed slightly below the level of the cams and preferably being inclined upwardly in accordance with conventional practice. Inasmuch as these screws rotate continuously, the pipe will be carried transversely, successively taking the positions shown at $P_4$, $P_5$, $P_6$, $P_7$, etc.

The arrangement of the cams gives rapid movement of the pipe sections in a transverse direction and, furthermore, the ramp 53 quickly gets out of the way of a succeeding pipe section. The flanges 50, 54 and 56 extending through about 180° of the cams provide about 90° of initial rotation during which the cams accelerate before the ramps engage the work or reach a position in which they block the passageways provided between the flanges. During the next approximately 180° of rotation the ramps act to move the pipe sections transversely and, at the end of this additional rotation, i. e., after the cams have been rotated a total of about 270°, the ramps have been moved out of the way of succeeding longitudinally moving sections of pipe. The last 90° of rotation can be utilized in decelerating the cams so that they can be stopped in idle position without undue shock on the machinery. Thus, while the cams rotate through 360° in each operation, they engage the work through only about 180° and are moving at substantially maximum rotational speed during the active portion of each revolution. This arrangement makes it possible to insure that each length of pipe will be moved quickly transversely of its original longitudinal direction of travel, thus enabling each preceding length to get out of the way of each following length even though the lengths are traveling at speeds of the order of, for example, 1,200 feet per minute with only a small gap between succeeding sections.

The conveyor screws 13 are driven continuously at such rotational speeds that the pipe sections deposited on the conveyor screws are taken away from the first thread space at least as fast as the cams operate to deliver pipe sections thereto. In order to drive the screws of the cooling bed, the end portions 63 of the screws are extended through suitable bearings supported by the frame member 15 and the wall of the housing 16 into the interior of the housing. Bevel gears 64 are secured to the ends of each screw. These gears mesh with bevel gears 65 carried by line shaft 66. Line shaft 66 is carried by appropriate bearings within the housing 16 and is driven through conventional gearing by motor 67. Alternate gears 65 on the shaft face in opposite directions thereby to secure opposite rotation of alternate screws 13.

To summarize the operation of the apparatus, the lengths of pipe P, $P_1$, $P_2$, etc. are conveyed along the rolls 10, the rolls 10 being driven at higher speeds than the pipe leaving the welding mill so that the successive sections are spaced somewhat, as shown in Figure 7. As each length reaches the position shown at $P_1$ in Figure 7, the leading end thereof engages a flag switch 70 (a photocell may be utilized instead of a flag switch, if desired) which, through appropriate electrical controls, causes the single revolution clutch 35 to be engaged. The motor 33 then rotates all of the cams 11 through 360°. This operation, as described above, moves the pipe section from position $P_1$ between flanges 50 and 54 to position $P_2$ between the flanges 54 and 56 of the cams. In this position, the pipe is no longer carried by rolls but simply slides on the guides 20, thus, the longitudinal speed of the pipe is reduced and, as diagrammatically indicated in Figure 7, a succeeding length of pipe in position $P_1$ may overtake the length in position $P_2$. However, the action of the cams is sufficiently rapid that the path for the following length is cleared before the following length has overtaken the preceding length.

The length in position $P_2$ slides between flanges 54 and 56 along guides 20, traveling from the broken line position $P_2$ to the full line position $P_2$ and preferably coming to stop before the cams operate again.

The next operation of the cams moves the first section of pipe from position $P_2$ to position $P_3$ on the conveyor screws (a slight forward motion as indicated between $P_2$ and $P_3$ in Figure 7 may be imparted to the pipe by the rotation of cams 11) and moves the following section to position $P_2$ between the flanges 54 and 56. The pipe sections are moved along the conveyor screws continuously; if they have not already come to rest, their forward motion stops because of frictional engagement with the screws and they take successively positions such as shown at $P_4$, $P_5$, etc., ordinarily stopping their longitudinal motion with the ends of the sections substantially in alignment. This operation goes on continuously, the lengths of pipe discharged from the welding mill being accelerated longitudinally by the rolls 10, then successively discharged transversely by the cams 11 onto the conveyor screws 13 and, finally, discharged from the remote ends of the conveyor screws 13 onto another conveyor or into racks 69 or the like as required by the layout of the plant and the succeeding operations to be performed.

From the foregoing description of a preferred form of the invention, it will be evident that I have provided an apparatus that will function reliably and efficiently to discharge rapidly moving work pieces in directions transverse to their axes. The apparatus is of sturdy construction and is substantially foolproof in operation. While the invention has been described herein in its application to the manufacture of pipe, those skilled in the art will appreciate that it may be adapted to other purposes and uses and that various changes and modifications may be made in the preferred form described herein without departing from the spirit and scope of the invention.

I claim:

1. In an apparatus of the type described, the combination of a conveyor for conveying successive lengths of elongated material in an axial direction, a conveyor for conveying said lengths in a direction transverse of their axes, and means for transferring said lengths from the axial conveyor to the transverse conveyor comprising a series of spaced screw-like cam members disposed in alignment with said axial conveyor with their axes substantially perpendicular thereto and alongside of said transverse conveyor, said cam members having hubs, continuous threads extending from the hubs having three spaced flange portions that lie in planes substantially perpendicular to the axes of the cams and extend upwardly in idle position of the cams throughout approximately half the circumference of the hubs and define two passageways, the first being in alignment with said axial conveyor and the second parallel thereto and disposed between said axial conveyor and said transverse conveyor, said threads having ramps extending between and connected to the flange portions that, upon rotation of said cams through one complete revolution, engage a length disposed in said first passageway to move said length bodily transversely of its axis into said second passageway and engage a length in said second passageway to move it onto said transverse conveyor and means for rotating said cams through a single revolution and stopping them in said idle position.

2. Apparatus according to claim 1 wherein stationary guides are provided for the lengths in said second passageway.

3. Apparatus according to claim 2 wherein the axes of said cams are disposed below the level of said guides by a distance less than the normal radius of the hubs of the cams, the radii of the hubs of the cams being reduced between the flanges defining the second passageway whereby said hubs clear lengths on said guides when said cams are in idle position.

4. In an apparatus of the type described, the combination of a conveyor for conveying successive lengths of elongated material in an axial direction, a screw conveyor for conveying said lengths in a direction transverse of their axes comprising a series of screws extending parallel to each other and transversely of the axes of said lengths and means for continuously rotating said screws, and means for transferring said lengths from the axial conveyor to the transverse conveyor while maintaining the lengths parallel to their original direction of travel comprising a series of spaced screw-like cam members disposed in alignment with said axial conveyor with their axes substantially perpendicular thereto and alongside of said transverse conveyor, said cam members having single continuous threads that in idle position define, by portions lying on both sides thereof, a passageway in alignment with said axial conveyor and that upon rotation of said cam members through one complete revolution engage a length disposed in said passageway to move said length bodily transversely of its axis toward said transverse conveyor and out of the path of a succeeding length carried by said axial conveyor and means controlled by the position of a length in said passageway for rotating said cams through a single revolution and stopping them in said idle position.

5. In an apparatus of the type described, the combination of a conveyor for conveying successive lengths of elongated material in an axial direction, a conveyor for conveying said lengths in a direction transverse of their axes, and means for transferring said lengths from the axial conveyor to the transverse conveyor comprising a series of spaced screw-like cam members disposed in alignment with said axial conveyor with their axes substantially perpendicular thereto and alongside of said transverse conveyor, said cam members having hubs, threads extending from the hubs having spaced flange portions that intersect the hub portions in planes perpendicular to the axes thereof and extend upwardly in idle position of the cams and define a passageway in alignment with said axial conveyor, and said threads having helical ramps joined to and extending between said flange portions and around approximately half the circumference of the hubs that upon rotation of said cams through one complete revolution engage a length disposed in said passageway to move said length bodily transversely of its axis toward to move said length bodily transversely of its axis toward and out of the path of a succeeding length carried by said axial conveyor.

6. In an apparatus having means providing a path through which successive lengths of elongated material travel in an axial direction, means for successively moving said lengths transversely of their axes from said path comprising a series of spaced cam members disposed along said path and mounted with their axes extending transversely of said path, each cam member having a hub portion and a single continuous radially extending thread projecting from said hub portions, said thread having a ramp extending helically along said hub and adapted to engage a length of material to move it transversely upon rotation of the cam member, said thread also having a flange portion intersecting the hub portion in a plane perpendicular to the axis thereof, said flange portion being disposed out of said path, said flange portion extending approximately half way around said hub and being joined to said ramp.

7. Apparatus according to claim 6 wherein said thread has a second flange portion spaced axially from the first flange portion, said ramp extending between the two flange portions, a second ramp having one end joined to the second flange portion and a third flange portion joined to the other end of said second ramp.

8. In combination, a longitudinal conveyor comprising a series of driven rolls adapted to convey successive lengths of pipe or the like in a path aligned with the axes of the lengths, a series of helical cams alternating with said rolls at one end of said longitudinal conveyor, a transverse screw conveyor disposed adjacent said cams adapted to convey successive lengths of pipe transversely of their axes and transversely of said longitudinal conveyor, said cams each having a hub portion and a single continuous thread extending outwardly therefrom, said thread having flange portions in one position defining both sides of a path in alignment with said longitudinal conveyor and having a helical portion extending between said flange portions adapted upon rotation of the cam to engage a length of pipe disposed in said path and move it toward said transverse conveyor, power means for driving said cams and means controlled by the position of a length of pipe on said longitudinal conveyor for controlling said power means.

9. In an apparatus of the type described an elongated frame structure, a series of spaced, individually motor driven conveyor rolls providing a longitudinal conveyor adapted to convey successive lengths of pipe along a path parallel to their axes, a housing extending along said frame structure, a series of spaced conveyor screws disposed below the level of said longitudinal conveyor extending transversely from said housing and transversely of said longitudinal conveyor, a line shaft disposed within said housing, means for driving said line shaft, bevel gears on said line shaft meshing with bevel gears on said conveyor screws, alternate bevel gears on said line shaft facing in opposite directions whereby alternate screws are rotated in opposite directions, a series of cam shafts extending transversely from said housing and transversely of said longitudinal conveyor, cams on said cam shafts disposed along the path of said longitudinal conveyor, said cams having threads thereon adapted to engage lengths of pipe to move said lengths transversely of said longitudinal conveyor and toward said transverse conveyor, means for driving said cams comprising a second line shaft within said housing carrying gears meshing with gears on said cam shafts, means for driving said second line shaft to impart a single revolution to said cam shafts, and means actuated by a length of pipe on said longitudinal conveyor for controlling said driving means.

10. In an apparatus of the type described an elongated frame structure, a series of spaced, individually motor driven conveyor rolls providing a longitudinal conveyor adapted to convey successive lengths of pipe along a path parallel to their axes, a housing extending along said frame structure, a series of spaced conveyor screws disposed below the level of said longitudinal conveyor extending transversely from said housing and transversely of said longitudinal conveyor, a line shaft disposed within said housing, means for driving said line shaft, gears on said line shaft meshing with gears on said conveyor screws, a series of cam shafts extending transversely from said housing and transversely of said longitudinal conveyor, cams on said cam shafts disposed along the path of said longitudinal conveyor, said cams having threads thereon adapted to engage lengths of pipe to move said lengths transversely of said longitudinal conveyor and toward said transverse conveyor, means for driving said cams comprising a second line shaft within said housing carrying gears meshing with gears on said cam shafts, and means for driving said second line shaft to impart a single revolution to said cam shafts.

11. In combination a longitudinal conveyor comprising a series of driven rolls adapted to convey successive lengths of pipe or the like in a path aligned with the axes of the lengths, a series of cams alternating with said rolls at one end of said longitudinal conveyor, said cams each having a hub portion and a thread extending outwardly therefrom, said thread in idle position of said cam providing a path in alignment with said longitudinal conveyor and having a helical portion adapted upon rotation of the cam to engage a length of pipe disposed in said path and move it transversely out of said path, means for driving said cams comprising shafts on which said cams are fixed, bevel gears on said shafts, a line shaft having spaced bevel gears thereon meshing with the gears on said shafts, power means for driving said line shaft, means controlled by the position of a length of pipe on said longitudinal conveyor for controlling said power means, and means for stopping said cams in idle position comprising a disk operatively connected to said driving means for said cams and rotatable in synchronism therewith, a roll resiliently urged against the periphery of said disk, said disk having a notch therein engageable by said roll when said disk is in a position corresponding to the idle position of said cams.

12. In combination a longitudinal conveyor adapted to convey successive lengths of pipe or the like in a path aligned with the axes of the lengths, a series of cams at one end of said longitudinal conveyor, said cams in idle position providing a path in alignment with said longitudinal conveyor and each of said cams having a portion adapted upon rotation of the cam to engage a length of pipe disposed in said path and move it transversely out of said path, driving means for said cams, and means for stopping said cams in idle position comprising a disk operatively connected to said driving means for said cams and rotatable in synchronism therewith, a roll resiliently urged against the periphery of said disk, said disk having a notch therein engageable by said roll when said disk is in a position corresponding to the idle position of said cams.

13. In combination a longitudinal conveyor adapted to convey successive lengths of pipe or the like in a path aligned with the axes of the lengths, a series of cams at one end of said longitudinal conveyor, said cams in idle position providing a path in alignment with said longitudinal conveyor and each of said cams having a helical portion adapted upon rotation of the cam to engage a length of pipe disposed in said path and move it transversely out of said path, a line shaft for driving said cams, power means for driving said line shaft, and means controlled by the position of a length of pipe on said longitudinal conveyor for controlling said power means, and means for stopping said cams in idle position comprising a disk operatively connected to said driving means for said cams and rotatable in synchronism therewith, a roll resiliently urged against the periphery of said disk, said disk having a notch therein engageable by said roll when said disk is in a position corresponding to the idle position of said cams.

14. In an apparatus of the type described, a conveyor for conveying lengths of elongated material in a direction transverse to their axes comprising a series of spaced screw-like cam members disposed with their axes substantially perpendicular to the axes of said lengths, said cam members having hubs, threads extending from the hubs having spaced flange portions that extend upwardly in the idle position of the cams and define a passageway parallel to the axes of said lengths, said threads having ramps extending between said flange portions that upon rotation of said cams through one complete revolution engage a length disposed in said passageway to move said length bodily transversely of its axis, guides for the lengths in said passageway, the axes of said cams being disposed below the level of said guides by a distance less than the normal radii of the hubs of the cams, the radii of the hubs of the cams being reduced between said flanges defining said passageway whereby said hubs are disposed out of contact with lengths supported on said guides when said cams are in idle position.

15. In an apparatus of the type described an elongated frame structure, a longitudinal conveyor adapted to convey successive lengths of pipe along a path parallel to their axes, a series of spaced conveyor screws extending transversely to one side of said longitudinal conveyor and disposed below the level of said longitudinal conveyor, means for driving said conveyor screws, a series of cam shafts extending transversely of said longitudinal conveyor, cams on said cam shafts disposed along the path of said longitudinal conveyor, said cams having threads thereon adapted to engage lengths of pipe to move said lengths transversely of said longitudinal conveyor and deposit them on said conveyor screws, the threads on said cams having flange portions disposed on the side of the path of said longitudinal conveyor opposite said conveyor screws, and means for driving said cams.

References Cited in the file of this patent

UNITED STATES PATENTS

| 849,122 | George | Apr. 2, 1907 |
| 1,626,734 | Hunt | May 3, 1927 |
| 1,929,487 | Feller | Oct. 10, 1933 |
| 2,057,131 | Barton et al. | Oct. 13, 1936 |
| 2,650,694 | Findlater | Sept. 1, 1953 |

FOREIGN PATENTS

| 435,393 | Germany | Oct. 12, 1926 |